Patented Nov. 11, 1930

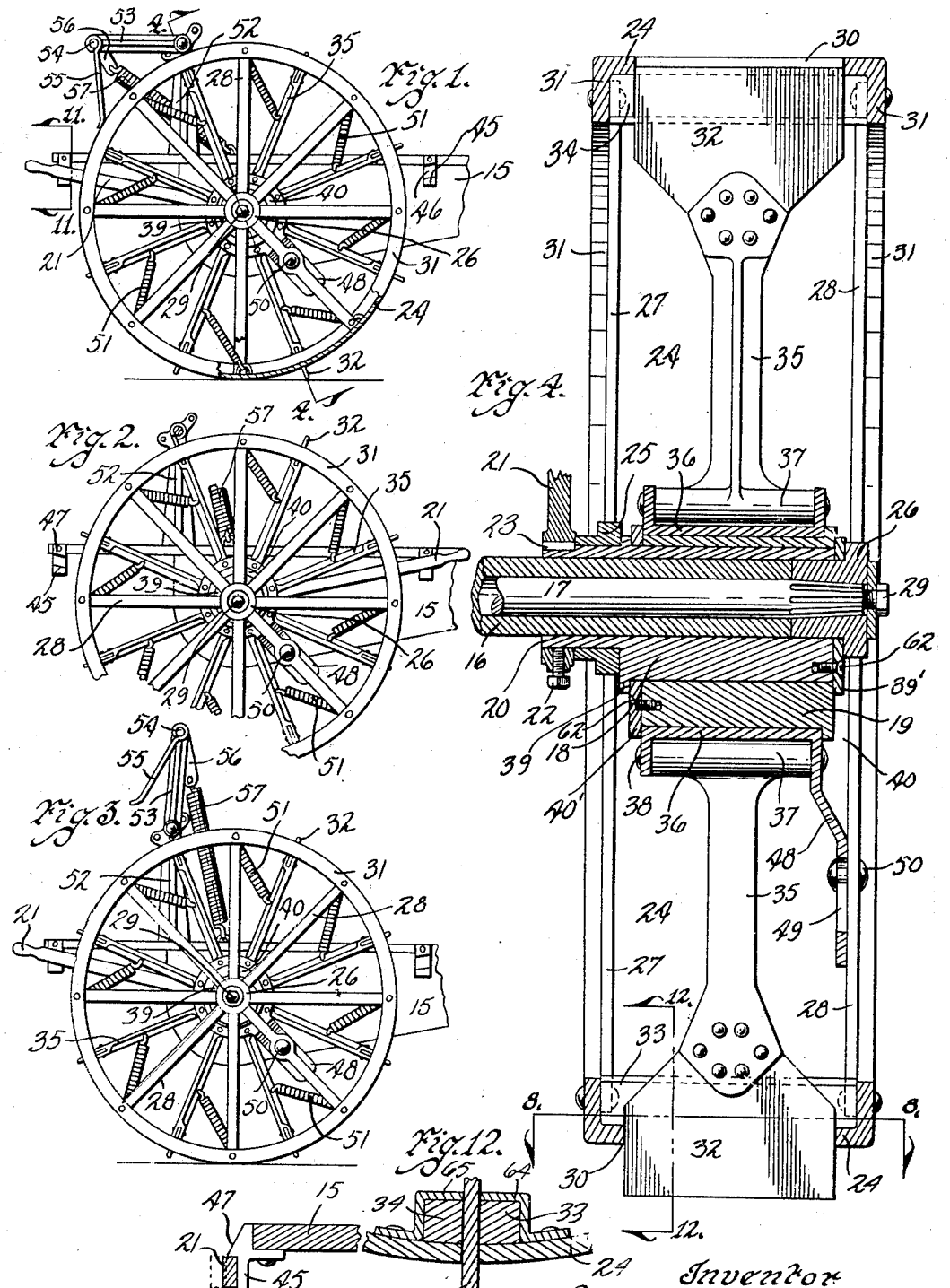

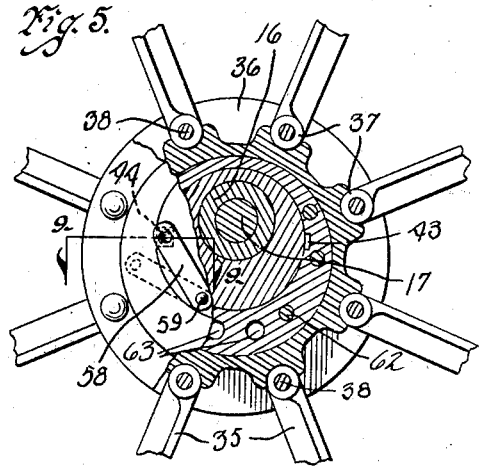
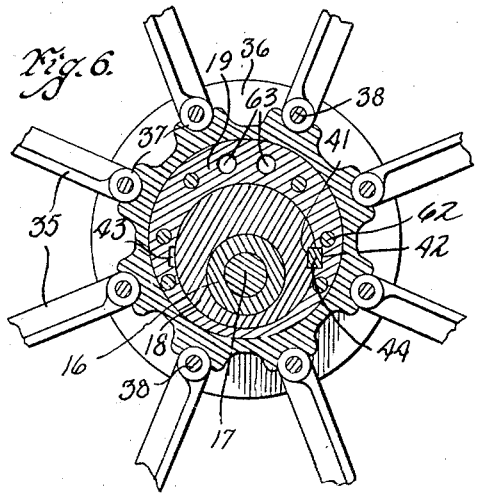
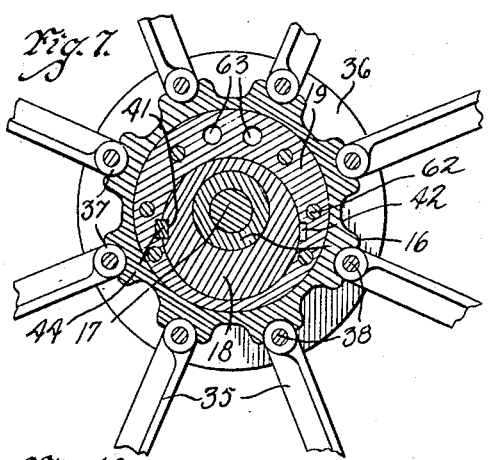
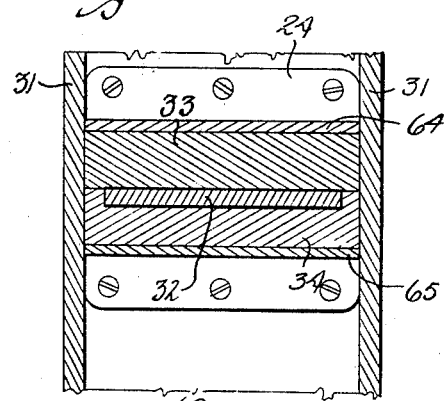
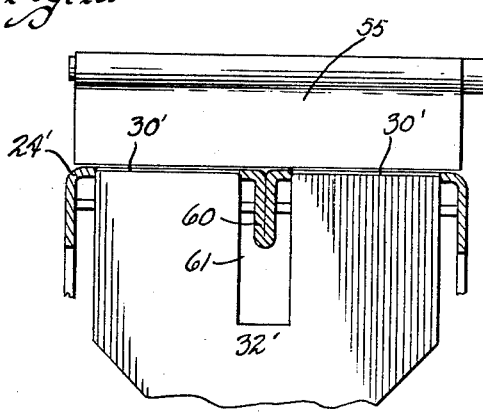
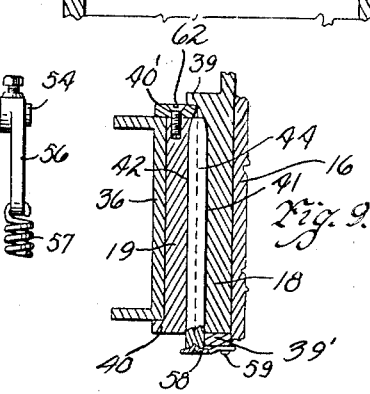

1,781,461

UNITED STATES PATENT OFFICE

VICTOR C. HUENEMANN, OF GARNER, IOWA

ADJUSTABLE DISAPPEARING-LUG TRACTION WHEEL

Application filed May 20, 1929. Serial No. 364,465.

The object of this invention is to provide an improved type of construction for a traction wheel for tractors or agricultural machinery, the wheel being equipped with traction lugs adapted for movement on radial lines and so arranged that they may be caused to project or be withdrawn relative to the rim of the wheel during travel.

A further object of the invention is to provide an improved construction for a traction wheel having traction lugs or blades radially mounted therein and having eccentric means for causing said blades to be projected at one part of the periphery of the wheel and to be withdrawn at another part of the periphery as the wheel revolves.

Another object of the invention is to provide an improved traction wheel having eccentric means for causing progressive projection and withdrawal of its traction lugs together with means for manually shifting the position of the eccentric devices whereby an adjustment is made in the point at which the lugs are projected and withdrawn.

Another and further object of the invention is to provide an improved traction wheel having double eccentric means for projecting and withdrawing its traction lugs together with means for altering the relative positions of the two eccentrics, whereby their function of projecting and withdrawing the lugs is suspended and the lugs are caused to remain stationary.

Still another object of the invention is to provide an improved traction wheel equipped with movable traction lugs and capable of being adjusted either for projection of the lugs at the bottom part of the wheel and simultaneous withdrawal at the upper part; for projection of the lugs at the upper part and withdrawal at the lower part of the wheel; or for stationary arrangement of the lugs, whereby they project uniformly throughout the periphery of the wheel.

Another and further object of the invention is to provide an improved disappearing lug traction wheel which is capable of being kept free from accumulations of earth on its rim by the use of a scraper.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation illustrating my improved traction wheel so arranged that its lugs are projected at the lower part of the wheel for tractive purposes and withdrawn at the upper part of the wheel to permit the use of a scraper.

Figure 2 is a similar view showing the parts so arranged that the lugs are projected at the upper part of the wheel and withdrawn at the lower part to provide a smooth surface for contact with a roadway or the like.

Figure 3 is a similar view illustrating still another position of the parts in which the traction lugs remain stationary and are projected uniformly throughout the periphery of the wheel.

Figure 4 is an enlarged diametrical section through the wheel on the line 4—4 of Figure 1.

Figure 5 is a detail section at the central portion of the wheel illustrating the position of the double eccentrics for that position of the parts illustrated in Figure 1.

Figure 6 is a similar view showing the position of the eccentrics for that position of the parts illustrated in Figure 2.

Figure 7 is a similar view showing the position of the eccentrics for that arrangement of parts shown in Figure 3.

Figure 8 is a detail section on the line 8—8 of Figure 4 illustrating the slide bearing arrangement of one of the movable traction lugs.

Figure 9 is a detail section on the line 9—9 of Figure 5 illustrating particularly the means for holding the two eccentrics in one position of adjustment.

Figure 10 is a detail sectional elevation illustrating a slightly modified form of a portion of the wheel rim and one of the lugs.

Figure 11 is a detail section on the line

11—11 of Figure 1 illustrating one of the latching lugs for the manual controlling lever.

Figure 12 is a detail section on the line 12—12 of Figure 4, illustrating the method of guiding the slidable traction lugs.

In the accompanying drawings I have employed the numeral 15 to designate a portion of a machine frame which may be a part of a tractor or of a binder or other agricultural implement upon which my improved traction wheels are to be used.

Carried by the frame 15 is an axle including a tubular member 16 and a spindle 17 therein. It is to be understood that one of my improved traction wheels may be mounted at each end portion of the axle, but only one of these wheels is here illustrated.

An eccentric sleeve 18 is fitted to and mounted upon one end portion of the tubular axle member 16 and a second or outer eccentric sleeve 19 is fitted to and mounted upon the sleeve 18. The inner eccentric 18 has an inner periphery engaging the surface of the tubular member 16 and an outer surface which is eccentric to its inner surface. The outer eccentric 19 has an inner cylindrical surface fitted to the outer surface of the inner eccentric and has an outer cylindrical surface eccentric to its inner surface. The two eccentrics preferably have the same degree of eccentricity.

The inner and outer eccentrics are capable of being locked together so that their thick portions are on the same side of the axle and the two eccentrics so locked together are capable of rotary adjustment on the axle so that the thick part is located either below the axle, as illustrated in Figures 1, 4 and 5, or above the axle as illustrated in Figures 2 and 6.

Furthermore the eccentrics are capable of being locked together so that their thick portions are arranged on opposite sides of the axle as illustrated in Figures 3 and 7.

At its inner end, the inner eccentric 18 is formed with a cylindrical extension 20, which has an outer surface concentric with the axle. To the extension 20 is secured a manual controlling lever 21 by means of which certain adjustments of the eccentrics may be made. Any desired means may be employed for attaching the lever 21 to the extension 20, such, for instance, as a set screw 22 or a key 23 or both.

A suitable traction wheel is provided and is formed primarily of a rim 24, inner and outer hub members 25 and 26 and inner and outer sets of spokes 27 and 28.

In this instance the inner hub member 25 is rotatably mounted on the tubular extension 20 while the outer hub member 26 is mounted directly on the outer end portion of the spindle 17 and is held in place by means of a nut 29. It is to be understood that any suitable method of mounting the wheel for rotation may be employed, but the method here shown permits the connection of the controlling lever 21 to the eccentrics by way of the tubular extension 20.

The wheel rim 24 is formed with a plurality of transverse slots 30 equally spaced apart circumferentially. To strengthen the wheel it is desirable to form the rim 24 with radially directed peripheral flanges 31.

Arranged for sliding movement through each of the slots 30 of the wheel rim is a traction lug or blade 32. To furnish suitable slide bearings for the slidable lugs 32 I prefer to employ wooden blocks 33 and 34, after the manner shown in Figure 8. These wooden bearing members may be impregnated with oil and they serve to protect the blades, to strip dirt therefrom, and also to deaden the noise of their movement. The blocks 33 and 34 may be held in place by Z-shaped securing strips 64 and 65 bolted or riveted to the wheel rim as shown in Figure 12.

The traction lugs 32 are pivotally connected by means of arms 35 to a rim member 36 rotatably mounted on the outer eccentric sleeve 19. The rim member 36 preferably is channel-shaped in cross section and the arms 35 are formed at their inner ends with bearing members 37 to receive pins 38 carried by said rim.

The inner eccentric sleeve 18 preferably is formed with peripheral flanges 39 between which the outer eccentric sleeve 19 is mounted; and the outer sleeve is formed with peripheral flanges 40 between which the rim member 36 is mounted. This serves to hold these parts in their proper relative positions. The flanges at one end of each eccentric are separately formed to permit removal and replacement, and are designated at 39' and 40' respectively. They are held in place by counter sunk screws 62.

The outer surface of the inner eccentric sleeve 18 is formed with a longitudinal keyway 41 and the inner surface of the outer eccentric 19 is formed with two diametrically opposite keyways 42 and 43. These keyways are adapted to receive a key 44 to lock the two eccentrics together in either of two positions.

The normal position or arrangement of the eccentrics is the one illustrated in Figures 5 and 6, in which the thick parts of both eccentrics are arranged on the same side of the axle. In this position use is made of the eccentrics to provide a doubly eccentric arrangement of the rim member 36 relative to the axle, and this eccentricity may be disposed below the axle as in Figure 5 or above the axle as in Figure 6.

The position of eccentricity below or above the axle is determined and controlled by the position of the hand lever 21 which is capable of moving through an arc of nearly one hundred eighty degrees. One position of the lever 21 is shown in Figure 1 and the other position is shown in Figure 2.

To hold the lever 21 in either of its positions, two similar latching lugs 45 are mounted on the frame 15, one behind the wheel and one in front thereof. Each of the latching lugs 45 is formed with a notch 46 to receive the lever 21 and is also formed with an inclined strike face 47 above said notch.

It is obvious that as the traction wheel revolves, the eccentrics being arranged with their thickened portions on the same side of the axle, the eccentric arrangement of the rim member 36 thus produced will cause the lugs 32 to be shifted radially relative to the rim 24 of the wheel. In other words, the lugs will be projected or pushed outwardly progressively throughout one section of the wheel and will be withdrawn or pulled in progressively throughout the remaining section of the wheel.

The position of the double eccentrics, either below the axle as shown in Figure 5, or above it as in Figure 6, will determine whether the projecting lugs will be at the bottom part of the wheel as shown in Figure 1, or at the upper part as shown in Figure 2.

It will be noted that when the hand lever 21 is in engagement with the rearmost latching lug 45 as shown in Figure 1, the double eccentrics are below the axle; and that when said lever is in engagement with the foremost latching lug as shown in Figure 2, the double eccentrics are above the axle.

Any desired means may be employed for causing the rim member 36 to rotate with the wheel. In this instance I have shown the rim member as formed with a radially projecting arm 48 which is formed with a longitudinal slot 49 to receive a rivet or the like 50, carried by one of the spokes 28 of the wheel.

It will be apparent that the eccentric mounting of the rim member and its conjunctive rotation with the wheel will cause the lugs 32 which are diametrically disposed relative to each other, to be arranged eccentrically relative to the rim 24 as shown in Figure 4.

In other words, taking the position of parts as shown in Figures 1 and 5, those lugs 32 on substantially the lower half of the wheel will be caused to project through the slots 30 and beyond the rim, while those lugs on the remaining portion will be partly or entirely withdrawn within the rim. The projecting lugs at the lower part of the wheel will, of course, be useful for tractive purposes in the ordinary manner.

To facilitate the operation of the sliding lugs, it may be desirable to employ coil springs, such as 51, each having one end fixed to an intermediate part of one of the lug-carrying arms 35, and the other end attached to a convenient part of the rim 24. These springs also serve to hold the lugs 32 against one side of the slide bearings.

Taking the position of the parts as shown in Figures 2 and 6, it will be apparent that the sliding lugs 32 are caused to project through the slots 30 throughout substantially the upper half of the wheel while those at the remaining portion are entirely withdrawn within the rim. This provides a smooth surface for that portion of the rim contacting with the road surface, which may be desirable at times when traveling over pavements or other surfaces.

It may be desirable at times to employ a scraping device for removing accumulations of earth from the rim of the traction wheel, and this is made possible under the conditions illustrated in Figure 1 by applying the scraper at the upper part of the wheel where the lugs are withdrawn.

For this purpose a bracket 52 is mounted on the frame 15 and carries a pivoted arm 53. A scraper shaft 54 is pivoted in the free end portion of the pivoted arm 53 and a scraper blade 55 is rigidly attached to said shaft. It is adapted to have one edge in engagement with the surface of the rim 24. Fixed to the scraper shaft 54 is a lug 56 to which a coil spring 57 is attached, said spring having its opposite end fixed to the frame at a position forwardly of the scraper.

When the pivoted arm 53 is placed in the position shown in Figure 1, in which it projects rearwardly from the bracket 52, the spring 57 acts to hold the scraper blades 55 in contact with the rim of the wheel. The scraper blade then serves to remove accumulations of earth or other substance from the rim.

When the parts are arranged as shown in Figure 2, so that the lugs are caused to project at the upper part of the wheel, it will be obvious that the scraper can not be used. To place the scraper in inoperative position, the pivoted arm 53 may be swung upwardly and forwardly through an arc. When the arm has passed beyond the center, the spring 57 serves to hold the scraper blade in inoperative position. This position of the parts is shown in Figures 2 and 3.

It will be noted that a traction wheel construction in accordance with my invention is capable of being used either with or without the traction lugs; that is to say, the traction lugs may be arranged in operative position or in inoperative position for tractive purposes. The only action necessary to change the parts from operative to inoperative position of the lugs is to move the lever 21 manually through an arc from the position shown in Figure 1 to the position shown in Figure 2, thus carrying the locked-together eccentrics from the position shown in Figure 5 to that shown in Figure 6.

There is still another possible position or condition of the parts of the device which is a neutral position so far as the eccentrics are concerned.

To secure this neutral condition, which is shown in Figure 7, the eccentrics 18 and 19 are arranged with thickened portions on opposite sides of the axle. Inasmuch as the eccentric sleeves have the same degree of eccentricity this arrangement will position the rim member 36 concentrically with respect to the axle.

When the parts are in this position, the rim member 36 will rotate with the wheel without causing any shifting movement of the traction lugs 32, which will be held constantly in the position shown in Figure 3, wherein they each project substantially one half their length beyond the rim of the wheel.

To place the parts in this position, it is necessary to withdraw the key 44 and rotate one of the eccentrics through an arc of one hundred eighty degrees relative to the other, to the position shown in Figure 7. The key 44 is then caused to enter the keyway 41 of the inner sleeve and the keyway 43 of the outer sleeve, rather than the keyway 42 in which it had been previously located. To hold the key 44 in place, I have provided a spring latching member 58 which is pivoted at one end on the outer end of the inner sleeve 18 at the point 59. The latching member 58 is normally placed in such position to overlie the outer end of the key 44, as shown in Figures 5 and 9.

To assist in rotating one eccentric relative to the other I have provided holes 63 in the loose eccentric 19, to receive a tool, not shown.

The parts may be placed in this neutral position at such times as it is desired to employ a medium degree of tractive assistance throughout the periphery of the wheel or when it is desired to minimize wear on the moving parts by eliminating sliding movement of the lugs.

At times it may be desirable to provide the wheel rim with a central rib to afford additional strength to compensate for the portions removed in forming the slots 30, or for other reasons.

This modified form is illustrated in Figure 10 in which I have employed the numeral 24' to designate the wheel rim and the numeral 60 to designate a rib extending circumferentially at its median line.

The rib 60 is continuous and for this reason it is necessary to form a slot 30' at each side thereof, in line with each other. The traction lugs 32' are formed with central notches 61 opening to their outer ends to permit the lugs to pass beyond the rib 60.

It is obvious that various changes and modifications may be made in the various parts of my improved traction wheel and that mechanical equivalents may be employed within the scope of the appended claims without departing from my invention.

I claim as my invention:

1. A device of the character described comprising an axle, a wheel mounted for rotation relative thereto, an eccentric sleeve on said axle, a second eccentric sleeve mounted on the first eccentric sleeve, a rim member mounted on the second eccentric sleeve, means for causing said rim member to rotate with the wheel and at the same time permitting radial movement relative thereto, traction lugs spaced circumferentially of the rim of the wheel and connected with said rim member, means for locking the eccentric sleeves together with their thick parts on the same side of the axle, whereby the rim member is held eccentrically relative to the axle and the lugs are caused to be progressively projected and withdrawn as the wheel revolves, and means for locking the eccentric sleeves together with their thick parts on opposite sides of the axle whereby the rim member is held concentrically of the axle and the sliding operation of the lugs is suspended.

2. A device of the character described comprising an axle, a wheel mounted for rotation relative thereto, an eccentric sleeve on said axle, a second eccentric sleeve mounted on the first eccentric sleeve, a rim member mounted on the second eccentric sleeve, means for causing said rim member to rotate with the wheel and at the same time permitting radial movement relative thereto, traction lugs spaced circumferentially of the rim of the wheel and connected with said rim member, means for locking the eccentric sleeves together with their thick parts on the same side of the axle, whereby the rim member is held eccentrically relative to the axle and the lugs are caused to be progressively projected and withdrawn as the wheel revolves, means for rotatably adjusting the locked-together eccentric sleeves on the axle to govern the position at which said lugs shall be projected, and means for locking the eccentric sleeves together with their thick parts on opposite sides of the axle whereby the rim member is held concentrically of the axle and the sliding operation of the lugs is suspended.

Des Moines, Iowa, April 9, 1929.

VICTOR C. HUENEMANN.